United States Patent
Rahardjo et al.

(10) Patent No.: US 10,366,025 B2
(45) Date of Patent: Jul. 30, 2019

(54) SYSTEMS AND METHODS FOR DUAL-PORTED CRYPTOPROCESSOR FOR HOST SYSTEM AND MANAGEMENT CONTROLLER SHARED CRYPTOPROCESSOR RESOURCES

(71) Applicant: Dell Products L.P., Round Rock, TX (US)

(72) Inventors: Johan Rahardjo, Austin, TX (US); Mukund P. Khatri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 283 days.

(21) Appl. No.: 15/239,142

(22) Filed: Aug. 17, 2016

(65) Prior Publication Data

US 2018/0053004 A1 Feb. 22, 2018

(51) Int. Cl.
| | |
|---|---|
| G06F 21/44 | (2013.01) |
| H04L 9/08 | (2006.01) |
| G06F 21/74 | (2013.01) |
| G06F 13/28 | (2006.01) |
| H04L 9/32 | (2006.01) |
| G09C 1/00 | (2006.01) |

(52) U.S. Cl.
CPC .............. *G06F 13/28* (2013.01); *G06F 21/44* (2013.01); *G06F 21/74* (2013.01); *H04L 9/0844* (2013.01); *H04L 9/3263* (2013.01); *G09C 1/00* (2013.01)

(58) Field of Classification Search
None
See application file for complete search history.

(56) References Cited

U.S. PATENT DOCUMENTS

| | | | | |
|---|---|---|---|---|
| 9,384,367 B2* | 7/2016 | Swanson | ................ | G06F 21/57 |
| 9,558,354 B2* | 1/2017 | Martinez | ................ | G06F 21/572 |
| 10,146,704 B2* | 12/2018 | Masuyama | ......... | G06F 12/1408 |
| 10,148,444 B2* | 12/2018 | Rahardjo | .............. | H04L 9/3263 |
| 2009/0031013 A1* | 1/2009 | Kunchipudi | .......... | G06F 9/4416 709/222 |
| 2009/0210456 A1* | 8/2009 | Subramaniam | ......... | G06F 21/57 |
| 2010/0235648 A1* | 9/2010 | Hoang | ................ | G06F 21/575 713/189 |
| 2013/0263205 A1* | 10/2013 | Jacobs | .................... | G06F 21/57 726/1 |

(Continued)

*Primary Examiner* — Kambiz Zand
*Assistant Examiner* — Arezoo Sherkat
(74) *Attorney, Agent, or Firm* — Jackson Walker L.L.P.

(57) ABSTRACT

In accordance with these and other embodiments of the disclosure, an information handling system may include a host system comprising a host system processor, a management controller communicatively coupled to the host system processor and configured to provide management of the information handling system via management traffic communicated between the management controller and a dedicated management network external to the information handling system, and a cryptoprocessor having a first communications interface to the host system and a second communications interface to the management controller and configured to carry out cryptographic operations on data communicated to the cryptoprocessor from the host system and the management controller such that the cryptoprocessor is accessible to the host system and the management controller.

21 Claims, 2 Drawing Sheets

(56) References Cited

U.S. PATENT DOCUMENTS

2014/0047243 A1* 2/2014 Lo .............................. G06F 8/71
                                                      713/189
2015/0106660 A1* 4/2015 Chumbalkar ....... G06F 11/0727
                                                       714/42

* cited by examiner

… (1) …

SYSTEMS AND METHODS FOR DUAL-PORTED CRYPTOPROCESSOR FOR HOST SYSTEM AND MANAGEMENT CONTROLLER SHARED CRYPTOPROCESSOR RESOURCES

TECHNICAL FIELD

The present disclosure relates in general to information handling systems, and more particularly to methods and systems for enabling a dual-ported cryptoprocessor for sharing cryptoprocessor resources between a host system and a management controller in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often include management controllers for out of band management of such information handling systems. In traditional systems, in order to provide for cryptographic functions associated with a host system and a management controller, each of the host system and management controller may "own" a respective cryptoprocessor. Such approach may have disadvantages, as it does not provide a way for the management controller to read a platform configuration register associated with the host system via the management controller remote management channel, and must instead be accessed via a host system application, which may render such communication of information open to an attack. These existing approaches also do not allow for side-band management of the host system's cryptoprocessor, do not allow for the management controller to derive a state of the host system's cryptoprocessor, or transmit a secure message that bridges the host system domain and the management controller domain.

SUMMARY

In accordance with the teachings of the present disclosure, the disadvantages and problems associated with existing approaches for providing cryptoprocessor functionality in an information handling system may be reduced or eliminated.

In accordance with these and other embodiments of the disclosure, an information handling system may include a host system comprising a host system processor, a management controller communicatively coupled to the host system processor and configured to provide management of the information handling system via management traffic communicated between the management controller and a dedicated management network external to the information handling system, and a cryptoprocessor having a first communications interface to the host system and a second communications interface to the management controller and configured to carry out cryptographic operations on data communicated to the cryptoprocessor from the host system and the management controller such that the cryptoprocessor is accessible to the host system and the management controller.

In accordance with these and other embodiments of the disclosure, a method may include coupling a host system of an information handling system, the host system comprising a host system processor, to a cryptoprocessor via a first communications interface of the cryptoprocessor. The method may also include coupling via a second communications interface of the cryptoprocessor the cryptoprocessor to a management controller communicatively coupled to the host system processor and configured to provide management of the information handling system via management traffic communicated between the management controller and a dedicated management network external to the information handling system and carrying out cryptographic operations on data communicated to the cryptoprocessor from the host system and the management controller such that the cryptoprocessor is accessible to the host system and the management controller.

In accordance with these and other embodiments of the isclosure, an article of manufacture may include a non-transitory computer-readable medium and a computer-executable instructions carried on the computer-readable medium, the instructions readable by a processor. The instructions, when read and executed, may cause the processor to: (i) couple a host system of an information handling system, the host system comprising a host system processor, to a cryptoprocessor via a first communications interface of the cryptoprocessor; (ii) couple via a second communications interface of the cryptoprocessor the cryptoprocessor to a management controller communicatively coupled to the host system processor and configured to provide management of the information handling system via management traffic communicated between the management controller and a dedicated management network external to the information handling system; and (iii) carry out cryptographic operations on data communicated to the cryptoprocessor from the host system and the management controller such that the cryptoprocessor is accessible to the host system and the management controller.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

Figure 1:
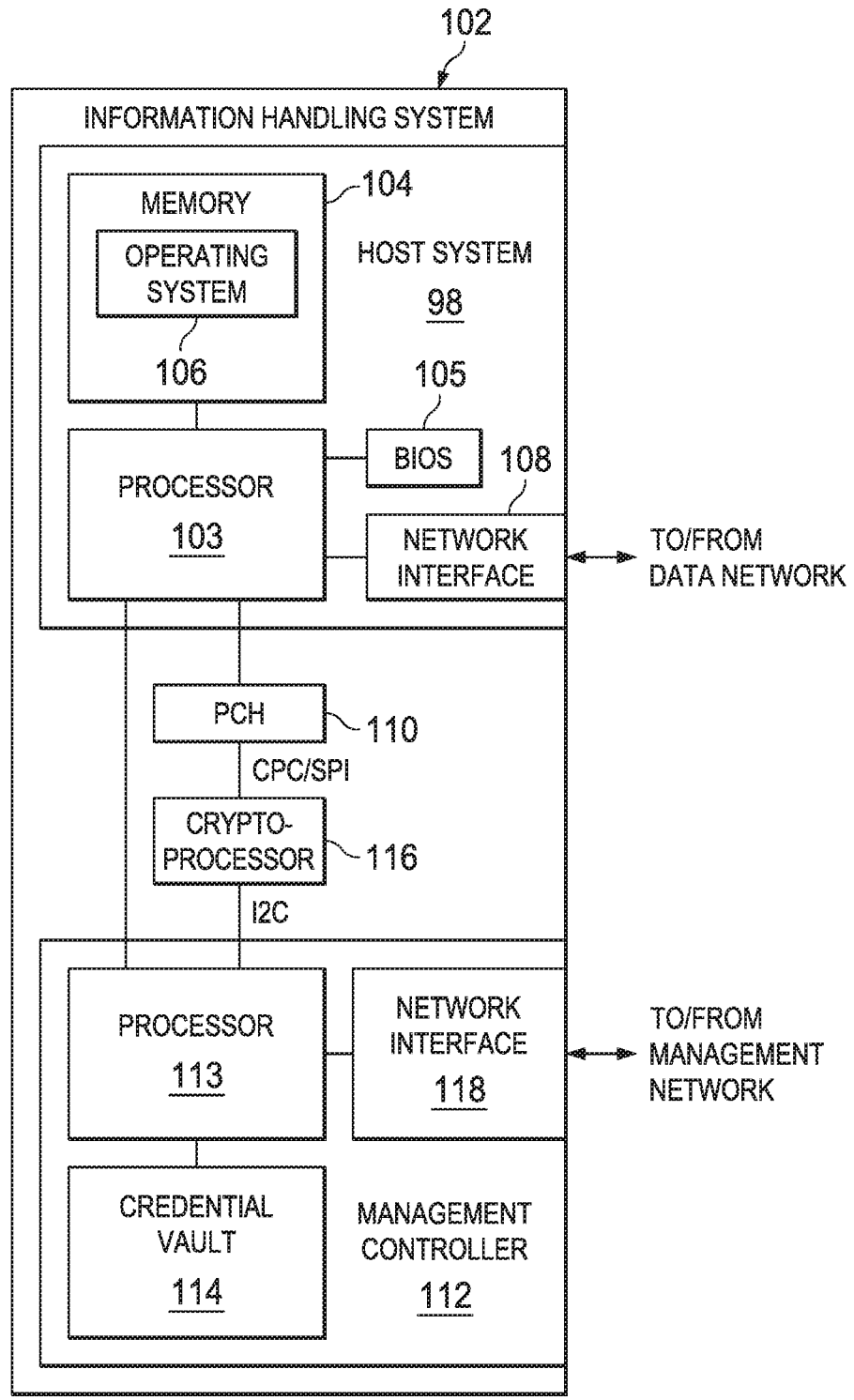
FIG. 1 illustrates a block diagram of an example information handling system, in accordance with embodiments of the present disclosure.

FIG. 1 illustrates a block diagram of an example information handling system 102, in accordance with embodiments of the present disclosure. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a BIOS 105 communicatively coupled to processor 103, a network interface 108 communicatively coupled to processor 103, a management controller 112 communicatively coupled to processor 103, a platform controller hub (PCH) 110 communicatively coupled to processor 103, and a cryptoprocessor 116 communicatively coupled to PCH 110 and a processor 113 of management controller 112.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Active portions of operating system 106 may be transferred to memory 104 for execution by processor 103. Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

Network interface 108 may comprise any suitable system, apparatus, or device operable to serve as an interface between information handling system 102 and one or more other information handling systems via an in-band management network. Network interface 108 may enable information handling system 102 to communicate using any suitable transmission protocol and/or standard. In these and other embodiments, network interface 108 may comprise a network interface card, or "NIC." In some embodiments, network interface 108 may comprise a 10 gigabit Ethernet network interface. In these and other embodiments, network interface 108 may be enabled as a local area network (LAN)-on-motherboard (LOM) card.

In operation, processor 103, memory 104, BIOS 105, and network interface 108 may comprise at least a portion of a host system 98 of information handling system 102.

PCH 110 may be any system, device, or apparatus configured to control certain data paths (e.g., data flow between processor 103, memory 104, and peripherals) and support certain functions of processor 103. A PCH 110 may also be known as a "chipset" of an information handling system 102.

Management controller 112 may be configured to provide management facilities for management of information handling system 102. Such management may be made by management controller 112 even if information handling system 102 is powered off or powered to a standby state. Management controller 112 may include a processor 113, memory, and a management network interface 118 separate from and physically isolated from data network interface 108. In certain embodiments, management controller 112 may include or may be an integral part of a baseboard management controller (BMC) or a remote access controller (e.g., a Dell Remote Access Controller or Integrated Dell Remote Access Controller). As shown in FIG. 1, management controller 112 may comprise a processor 113, a credential vault 114 communicatively coupled to processor 113, and a network interface 118 communicatively coupled to processor 113.

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in a memory and/or another component of information handling system 102 or management controller 112. As shown in FIG. 1, processor 113 may be communicatively coupled to processor 103. Such coupling may be via a Universal Serial Bus (USB), System Management Bus (SMBus), and/or one or more other communications channels.

Credential vault 114 may comprise a database or any other suitable data structure stored in computer-readable media integral to or otherwise accessible to processor 113, and may be used to store passwords and similar cryptographic key material. For example, data stored in credential vault 114 may comprise current and historical passwords to privileged accounts. In some embodiments, all passwords and keys may be encrypted, to protect against disclosure to an attacker who has compromised the physical storage media where credentials are stored or backed up. Access to contents of credential vault 114 is often subject to access controls, so that different (authenticated) users are able to fetch different sets of passwords or keys. Accordingly, credential vault 114 may only be accessible in connection with a hardware-verified boot.

Network interface 118 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." In some embodiments, network interface 118 may comprise a 1 gigabit Ethernet network interface.

Cryptoprocessor 116 may be communicatively coupled to processor 113 (e.g., via an Inter-Integrated Circuit or "I2C" bus) and communicatively coupled to PCH 110 (e.g., via a low-pin count or "LPC" bus, or via a Serial Peripheral Interface or "SPI" bus). For example, in accordance with the TPM 2.0 specification, PCH 110 may be coupled to cryptoprocessor 116 in the manner defined by the specification via an LPC or SPI bus, while otherwise unused input/output pins of cryptoprocessor 116 may be used as the interface port for management controller 112. Cryptoprocessor 116 may include any system, device, or apparatus configured to carry out cryptographic operations on data communicated to it from processor 113 and/or another component of management controller 112 and cryptographic operations on data communicated to it from PCH 110. Thus, cryptoprocessor 116 may be shared by management controller 112 and PCH 110, and thus have individual ports interfacing with each of management controller 112 and PCH 110. In some embodiments, cryptoprocessor 116 may be compliant with the Trusted Platform Module (TPM) specification, a successor specification, and/or any other similar specification. In some embodiments, cryptoprocessor 116 may be configured to generate random numbers, generate encryption keys (e.g., RSA keys), generate and maintain hash key tables of hardware and software components associated with management controller 112, generate and maintain configuration parameters associated with hardware and software components of management controller 112, wrap (e.g., encrypt) keys, unwrap (e.g., decrypt) keys and/or store keys (e.g., endorsement key, storage root key, attestation identity keys, storage keys).

In addition to processor 103, memory 104, network interface 108, management controller 112, and cryptoprocessor 116, information handling system 102 may include one or more other information handling resources.

In operation, cryptoprocessor 116 may serve as a cross-domain resource accessible to a domain of host system 98 (e.g., via PCH 110) and a domain management controller 112, and may serve as a secure bridge between the two domains, as described in greater detail below. Accordingly, as described in greater detail below, the systems and methods described herein may enable cross-domain features to be shared by host system 98 domain and management controller 112 domain via communication via cryptoprocessor 116, management of a host system-owned cryptoprocessor via a side-band interface of management controller 112, and the effective co-location of a management controller-owned cryptoprocessor within a host system-owned cryptoprocessor.

Figure 2:
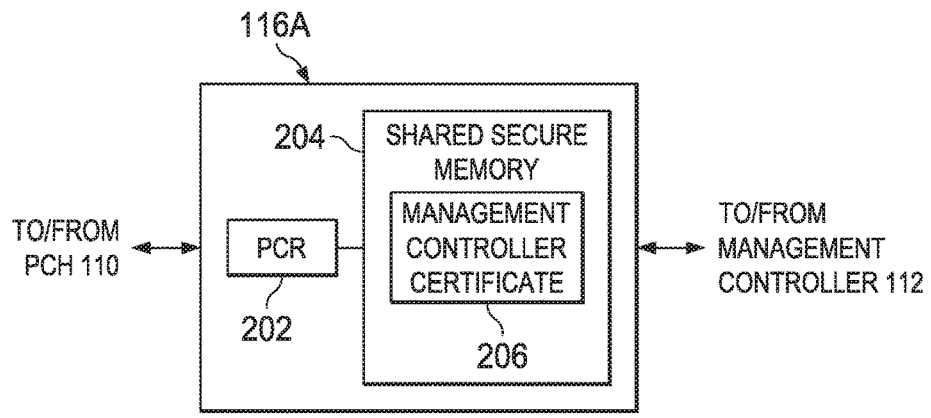
FIG. 2 illustrates a functional block diagram of selected components of an example cryptoprocessor for enabling cross-domain features to be shared by a host system domain and management controller domain via communication via the cryptoprocessor, in accordance with embodiments of the present disclosure.

FIG. 2 illustrates a functional block diagram of selected components of an example cryptoprocessor 116A for enabling cross-domain features to be shared by a host system 98 domain and management controller 112 domain via communication via cryptoprocessor 116A, in accordance with embodiments of the present disclosure. In some embodiments, cryptoprocessor 116A may be used to implement cryptoprocessor 116 depicted in FIG. 1. In the implementations represented by FIG. 2, a shared secure memory 204 (e.g., a non-volatile RAM) may store a management controller certificate 206 that both the host system 98 domain and the management controller 112 domain may read. Accordingly, a trusted secure channel may be formed between host system 98 and management controller 112 via cryptoprocessor 116A allowing for the exchange of secure information between host system 98 and management controller 112. In some embodiments, such trusted secured channel may be authenticated by a measurement, such as by a verification of data in PCR 202 associated with host system 98 and/or management controller 112. For example, data in shared secure memory 204 may be accessible only when both a PCR associated with BIOS 105 (e.g., BIOS hash_extend) and a PCR associated with management controller 112 (e.g., BMC hash_extend) match a value used during a sealing process of shared secure memory 204.

Figure 3:
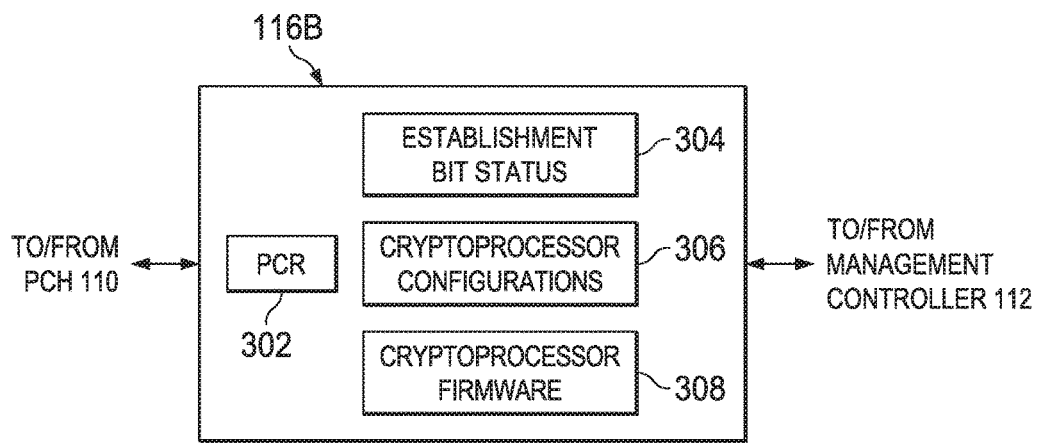
FIG. 3 illustrates a functional block diagram of selected components of an example cryptoprocessor for management of a host system-owned cryptoprocessor via a side-band interface of a management controller, in accordance with embodiments of the present disclosure.

FIG. 3 illustrates a functional block diagram of selected components of an example cryptoprocessor 116B for management of a cryptoprocessor associated with host system 98 via a side-band interface of management controller 112, in accordance with embodiments of the present disclosure. In some embodiments, cryptoprocessor 116B may be used to implement cryptoprocessor 116 depicted in FIG. 1. In the implementations represented by FIG. 3, management controller 112 may be able to monitor an establishment bit status 304 in order to perform a run-time security status check (e.g., determine host system's Trusted Execution Technology or "TXT" status directly from shared cryptoprocessor 116). This may be an improvement over traditional approaches, in which a potentially less-secure message or command is communicated via an unsecured Intelligent Platform Management Interface command by host system 98 to management controller 112. In addition, in the implementations represented by FIG. 3, management controller 112 may configure cryptoprocessor manufacture configuration bits 306. This may be an improvement over traditional approaches, in which such configuration is performed by host system 98, which may be less secure. Furthermore, in the implementations represented by FIG. 3, management controller 112 may update cryptoprocessor firmware 308 via its sideband interface with cryptoprocessor 116B. Typically in traditional approaches, update of cryptoprocessor firmware is not offered, as such update would be through host system 98, which may have a large attack surface. However, the attack surface of a sideband firmware update from management controller 112 may be smaller and thus more secure. Additionally, in the implementations represented by FIG. 3, management controller 112 may be able to perform secure monitoring of host system 98, such as reading measurements in PCR 302 associated with host system 98 (e.g., Boot Guard PCR measurement or other measurements).

Figure 4:
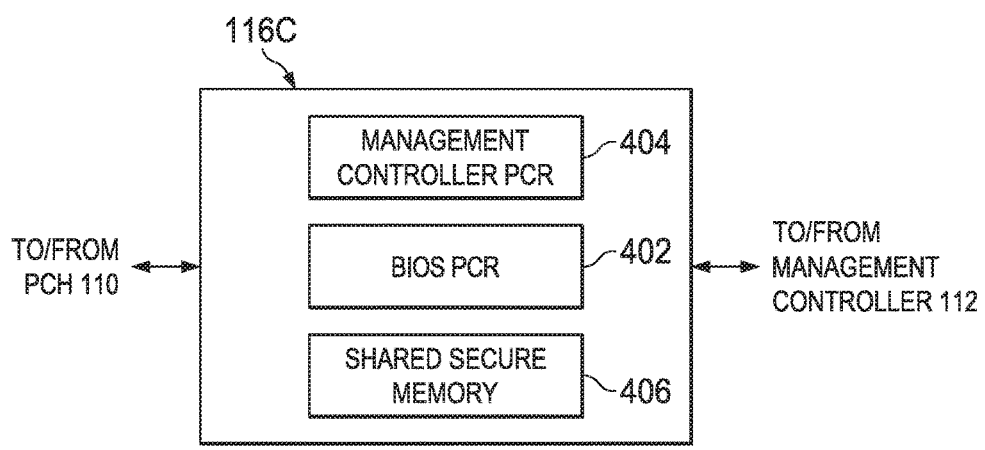
FIG. 4 illustrates a functional block diagram of selected components of an example cryptoprocessor for co-location of a management controller-owned cryptoprocessor within a host system-owned cryptoprocessor, in accordance with embodiments of the present disclosure.

FIG. 4 illustrates a functional block diagram of selected components of an example cryptoprocessor 116C for co-location of a management controller-owned cryptoprocessor within a host system-owned cryptoprocessor, in accordance with embodiments of the present disclosure. In some embodiments, cryptoprocessor 116C may be used to implement cryptoprocessor 116 depicted in FIG. 1. In the implementations represented by FIG. 4, a management controller 112-owned cryptoprocessor hierarchy may be used as management controller 112-specific storage in shared secure memory 406, using management controller 112-specific authorization. Thus, cryptoprocessor 116C may include resister banks for two PCRs, a BIOS PCR 402 and a management controller PCR 404, each with different authorization algorithms. Such implementations may provide read-only access of BIOS PCR 402 and thus enable host system platform attestation via a complete side-band interface/remote management, as opposed to less secure traditional approaches in which an application executing on host system 98 would communicate such information.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
    a host system comprising a host system processor;
    a management controller communicatively coupled to the host system processor and configured to provide management of the information handling system via management traffic communicated between the management controller and a dedicated management network external to the information handling system; and a dual-ported, shared cryptoprocessor having a first communications interface coupled, via a platform controller hub, to the host system and a second communications interface coupled directly to the management controller, the cryptoprocessor being configured to carry out cryptographic operations both on data communicated to the cryptoprocessor from the host system and on data communicated to the cryptoprocessor from the management controller such that the cryptoprocessor is accessible to the host system and the management controller.

2. The information handling system of claim 1, wherein the cryptoprocessor is further configured to allow sharing of data stored in a shared secure memory of the cryptoprocessor by the host system and the management controller.

3. The information handling system of claim 2, wherein the cryptoprocessor is further configured to store a certificate usable to establish a trusted secure channel between the host system and the management controller via the cryptoprocessor, the trusted secure channel being usable for exchange of secure information between the host system and the management controller.

4. The information handling system of claim 3, wherein the trusted secure channel is authenticated by at least one of a measurement associated with the host system and a measurement associated with the management controller.

5. The information handling system of claim 1, wherein the cryptoprocessor is further configured to provide a secure sideband interface for management of the cryptoprocessor by the management controller.

6. The information handling system of claim 5, wherein the management controller is further configured to manage the cryptoprocessor via the secure sideband interface by performing at least one of:
   monitoring an establishment bit status of the host system in order to determine a run-time security status check of the host system;
   configuring cryptoprocessor manufacture configuration bits;
   updating cryptoprocessor firmware; and
   performing secure monitoring of the host system.

7. The information handling system of claim 1, wherein the cryptoprocessor is further configured to provide co-location of cryptoprocessor services owned by the management controller within the cryptoprocessor owned by the host system.

8. A method comprising:
   coupling a host system of an information handling system to a first communications interface of a dual-ported, shared cryptoprocessor, wherein the coupling between the host system and the cryptoprocessor is via a platform controller hub of the host system, and wherein the host system includes a host system processor;
   coupling a second communications interface of the cryptoprocessor directly to a management controller communicatively coupled to the host system processor and configured to provide management of the information handling system via management traffic communicated between the management controller and a dedicated management network external to the information handling system; and
   the cryptoprocessor carrying out cryptographic operations both on data communicated to the cryptoprocessor from the host system and on data communicated to the cryptoprocessor from the management controller such that the cryptoprocessor is accessible to the host system and the management controller.

9. The method of claim 8, further comprising sharing of data stored in a shared secure memory of the cryptoprocessor by the host system and the management controller.

10. The method of claim 9, further comprising storing a certificate usable to establish a trusted secure channel between the host system and the management controller via the cryptoprocessor, the trusted secure channel being usable for exchange of secure information between the host system and the management controller.

11. The method of claim 10, further comprising authenticating the trusted secure channel by at least one of a measurement associated with the host system and a measurement associated with the management controller.

12. The method of claim 8, further comprising providing a secure sideband interface for management of the cryptoprocessor by the management controller.

13. The method of claim 12, further comprising managing, by the management controller, the cryptoprocessor via the secure sideband interface by performing at least one of:
   monitoring an establishment bit status of the host system in order to determine a run-time security status check of the host system;
   configuring cryptoprocessor manufacture configuration bits;
   updating cryptoprocessor firmware; and
   performing secure monitoring of the host system.

14. The method of claim 8, further comprising providing co-location of cryptoprocessor services owned by the management controller within the cryptoprocessor owned by the host system.

15. An article of manufacture comprising:
   a non-transitory computer-readable medium; and
   computer-executable instructions carried on the computer-readable medium, the instructions readable by a processor, the instructions, when read and executed, for causing the processor to:
      couple a host system of an information handling system to a first communications interface of a dual-ported, shared cryptoprocessor, wherein the coupling between the host system and the cryptoprocessor is via a platform controller hub of the host system, and wherein the host system includes a host system processor;
      couple a second communications interface of the cryptoprocessor directly to a management controller communicatively coupled to the host system processor and configured to provide management of the information handling system via management traffic communicated between the management controller and a dedicated management network external to the information handling system; and
      carry out, at the cryptoprocessor, cryptographic operations both on data communicated to the cryptoprocessor from the host system and on data communicated to the cryptoprocessor from the management controller such that the cryptoprocessor is accessible to the host system and the management controller.

16. The article of claim 15, the instructions for further causing the processor to share data stored in a shared secure memory of the cryptoprocessor by the host system and the management controller.

17. The article of claim 16, the instructions for further causing the processor to store a certificate usable to establish a trusted secure channel between the host system and the management controller via the cryptoprocessor, the trusted secure channel being usable for exchange of secure information between the host system and the management controller.

18. The article of claim 17, the instructions for further causing the processor to authenticate the trusted secure channel by at least one of a measurement associated with the host system and a measurement associated with the management controller.

19. The article of claim 15, the instructions for further causing the processor to provide a secure sideband interface for management of the cryptoprocessor by the management controller.

20. The article of claim 19, the instructions for further causing the processor to allow management, by the management controller, of the cryptoprocessor via the secure sideband interface by performing at least one of:
   monitoring an establishment bit status of the host system in order to determine a run-time security status check of the host system;
   configuring cryptoprocessor manufacture configuration bits;
   updating cryptoprocessor firmware; and
   performing secure monitoring of the host system.

21. The article of claim 15, the instructions for further causing the processor to provide co-location of cryptoprocessor services owned by the management controller within the cryptoprocessor owned by the host system.

\* \* \* \* \*